Figure 3:
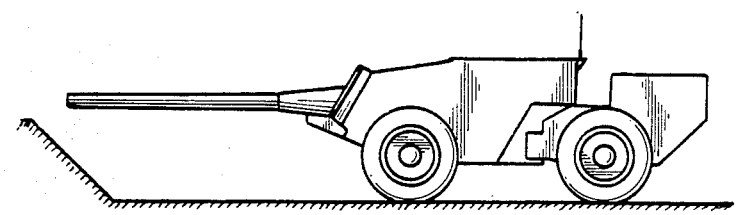

United States Patent [19]

Fagel

[11] Patent Number: 4,534,267

[45] Date of Patent: Aug. 13, 1985

[54] SELF-PROPELLED ARMORED VEHICLE

[76] Inventor: Roger Fagel, Avenue Forestiere, 102, Marcinelle, Belgium

[21] Appl. No.: 811,899

[22] Filed: Jun. 28, 1977

[30] Foreign Application Priority Data

Jun. 29, 1976 [BE] Belgium .............................. 0168413

[51] Int. Cl.² ............................................ F41H 7/02
[52] U.S. Cl. ................................................ 89/40.03
[58] Field of Search ................... 89/36 H, 40 B, 40 C, 89/40 F, 40 L

[56] References Cited

U.S. PATENT DOCUMENTS

| 1,485,605 | 3/1924 | Glatter | 89/40 B |
| 2,341,151 | 2/1944 | Maloon | 89/36 H |
| 3,351,037 | 11/1967 | Meili | 89/40 B |
| 4,031,807 | 6/1977 | Boyer | 89/40 B |

FOREIGN PATENT DOCUMENTS

| 53248 | 4/1912 | Austria | 89/40 B |
| 2056486 | 5/1972 | Fed. Rep. of Germany | 89/40 B |
| 504610 | 7/1920 | France | 89/40 B |
| 21724 | 1/1921 | France | 89/40 C |
| 1438403 | 6/1976 | United Kingdom | 89/40 C |

*Primary Examiner*—Stephen C. Bentley
*Attorney, Agent, or Firm*—Bacon & Thomas

[57] ABSTRACT

An armored vehicle has front and rear sections pivoted together about a vertical axis. Each section has a pair of electrically driven wheels which can be selectively raised or lowered relative to their particular section. Hydraulic motors control the angular relation of the sections about their pivot axis. The front section mounts an elevatable gun and provides room for a crew and ammunition while the rear section carries a source of electric power for all the wheels.

3 Claims, 6 Drawing Figures

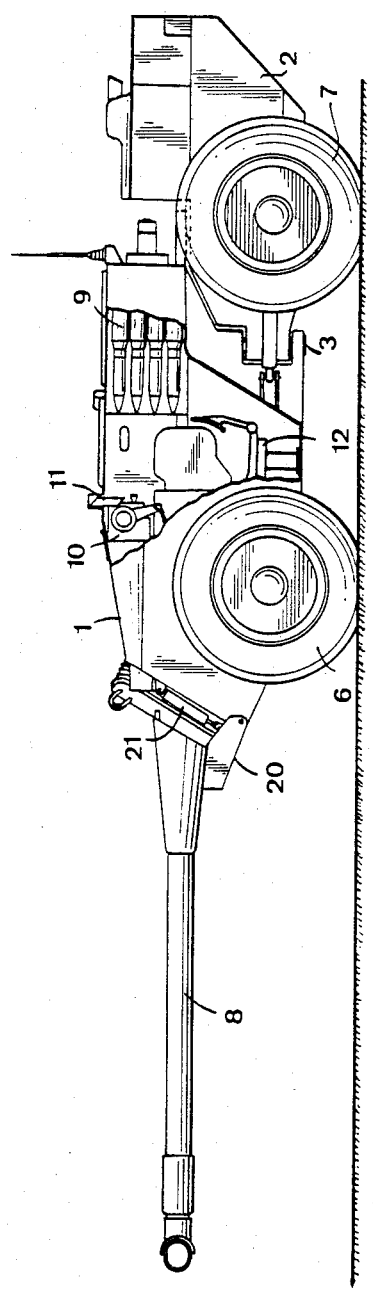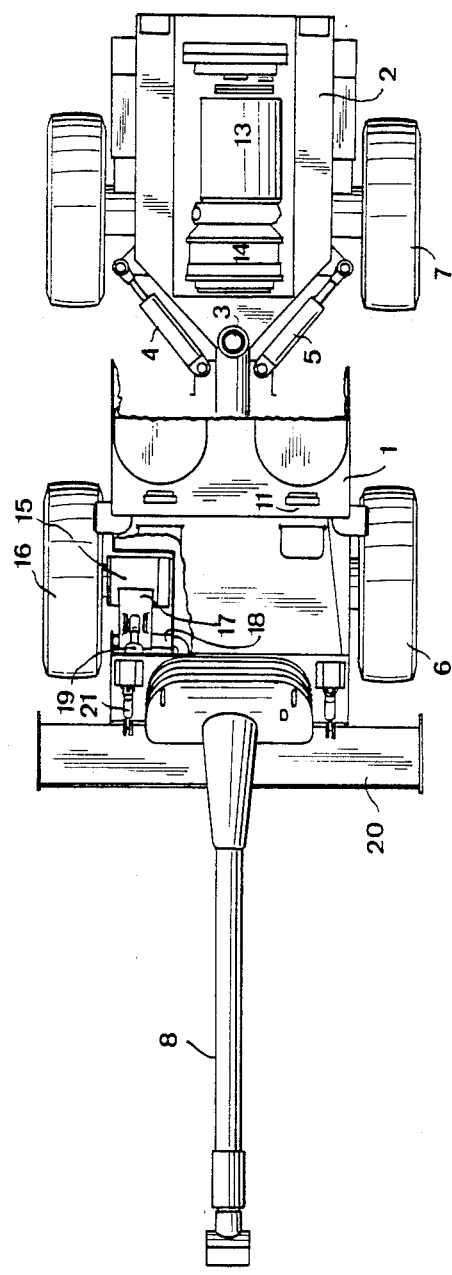
FIG.1
FIG.2

SELF-PROPELLED ARMORED VEHICLE

The present invention concerns a new concept of a self-propelled armored vehicle.

Self-propelled armored vehicles, as classically conceived, are in the form of a vehicle consisting of an armored casemate supported by wheels, or tracks, the aforesaid armored casemate containing a weapon, or weapons, ammunition for the weapon, or weapons, equipment for drivng the vehicle and for sighting the weapon, or weapons, the vehicle's power package (generally an internal combustion engine), fuel for the power package, and the seats and accessories for the vehicle's crew.

Moreover, again as classically conceived, the weapons, or at least the main weapon (a 90 mm gun, for example), are installed in a rotatable turret mounted on the upper part of the vehicle to permit the vehicle to fire on any required azimuth. The end result is a high vehicle offering a very visible target for enemy fire. Even when, in accordance with some particular tactic, the vehicle is "dug in" in a camouflaged pit with only the rotatable turret visible, the target is clearly visible at a significant height.

The present invention concerns a new concept of a self-propelled armored vehicle, one providing a vehicle with a low profile, low weight, and great maneuverability, and one that can travel at relative high speeds.

According to the present invention, the self-propelled armored vehicle is fundamentally characterized by the fact that:

a forward casemate, an after caisson, said forward casemate and said after caisson being joined one with the other, around a vertical pivot axis, said forward casemate being supported by at least one train of driving wheels, said after caisson being supported by at least one train of driving wheels, said forward casemate having means for accommodating at least one weapon, ammunition, equipment to maneuver the vehicle and to sight the weapon, and the crew, said after caisson having means for accommodating the vehicle's power package for energizing said driving wheels, said driving wheels being mounted on a variable-height suspension, means acting symmetrically for linking said forward casemate to said after caisson to determine the relative horizontal angular position of said forward casemate with respect to said after caisson, and means for varying the variable height suspension of said driving wheels supporting said forward casemate and said after caisson to determine the relative height of said forward casemate and said after caisson with respect to the ground.

The characteristics of the invention will appear in the description which will make reference to the appended drawings, which represent, respectively:

FIG. 1, a detailed view, in elevation and in section, of one form of realization of a self-propelled armored vehicle in accordance with the present invention;

FIG. 2, a plan view with a partial section of the same vehicle;

FIGS. 3 to 6, showing the vehicle very schematically, and illustrating the possibilities of using the variable-height suspension;

Those details are required for good understanding of the subject of the invention have been omitted voluntarily in order to simplify the above figures.

In FIGS. 1 and 2, 1 designates the forward casemate, and 2 designates the after caisson, linked together by vertical articulation 3. Hydraulic cylinders 4 and 5, symmetrical with respect to vertical articulation 3, make it possible to vary the position of the forward casemate with respect to the after caisson. It also is possible to steer the vehicle when it is moving, or to orient the forward casemate in the firing position.

Forward casemate 1 and after caisson 2 are each supported by a train of drive wheels, 6 and 7, respectively, made for suspension at variable heights as will be described in what follows.

Forward casemate 1 contains gun 8, adjustable in elevation, and articulated on the frontal armor of the casemate, ammunition 9, sighting and maneuvering devices, such as telescope 10 and periscopes 11, and seats 12 for the vehicle's crew. The equipment required to maneuver the vehicle has not been shown in order to avoid cluttering up the drawing.

In accordance with a preferred form of implementation of the invention, the power package installed in after caisson 2 consists of an internal combustion engine 13, driving an electric current generator, 14. The trains of drive wheels, 6 and 7, supporting forward casemate 1 and after caisson 2, respectively, are fitted with wheels containing electric motors supplied from electric current generator 14 of the power package.

Each of the wheels of trains 6 and 7 is driven by an electric motor supplied by alternator 14 under control of the vehicle's crew. For clarity of the drawing, only electric motor 15, driving wheel 16 of wheel train 6, is shown. Electric motor 15 is mounted on the end of arm 17, which pivots on shaft 18, integral with the chassis of forward casemate 1. Its position is controlled by hydraulic cylinder 19 so as to vary the height of the axle of the wheel train with respect to the chassis of forward casemate 1. An arrangement such as this is envisaged for each wheel, and variation in the position of the axle of a wheel train can be obtained by working the hydraulic cylinders, such as 19, operating on the same train of wheels, simultaneously.

The advantages of the variable-height suspension for wheel trains 6 and 7, respectively supporting forward casemate 1 and after caisson 2, will be explained in what follows, with reference being made to FIGS. 3 through 6.

FIG. 3 shows a self-propelled armored vehicle in accordance with the invention in the "high" position. In this position, wheel trains 6 and 7 supporting forward casemate 1 and after caisson 2, respectively, are in the lowered position such that ground clearance is sufficient for the vehicle to move without the lower part of the forward casemate and of the after caisson coming in contact with obstacles on the ground. This "high" position is preferred when the vehicle is on the move, but it can be used equally well when the vehicle is firing in accordance with a technique that will be explained, and as described further on.

Figure 4:
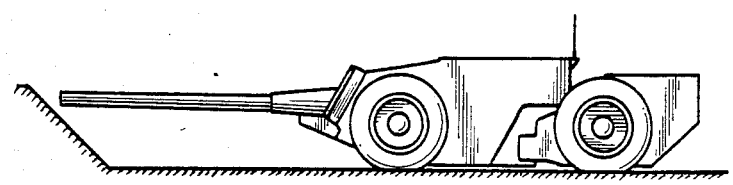

FIG. 4 shows the same self-propelled armored vehicle in the "low" position. In this position, wheel trains 6 and 7 supporting forward casemate 1 and after caisson 2, respectively, are in an elevated position such that the lower part of the forward casemate and of the after caisson are practically in contact with the ground. This "low" position is preferred when the vehicle is firing, except for the utilization in combination with the "high" position mentioned above, and described further on.

Further, the combination of the two positions, "high" and "low", of the vehicle, a result brought about by the simultaneous use of the variable-height suspensions of all wheel trains, makes it possible, because of the position of the sights on the upper part of the vehicle's forward casemate, to point and elevate as necessary when, with the vehicle in the "low" position, the vehicle is screened by, for example, a fold in the terrain, or by an artificial slope, so that gun 8 is not visible in the front, and the vehicle can only be given the order to fire when the vehicle is in the "high" position, thus removing the gun from the dead angle of the fold in the ground, or of the slope, on condition of a slight correction of position in elevation of the gun to compensate for the movement of the vehicle from the "low" to the "high" position.

This special feature in the exploitation of the self-propelled armored vehicle according to the invention is readily deduced by comparing FIGS. 3 and 4 of the appended drawings. This will be of particular use when the vehicle is "dug in" in a camouflaged pit and is making preparations for firing, thus offering a target of minimum height.

Figure 5:
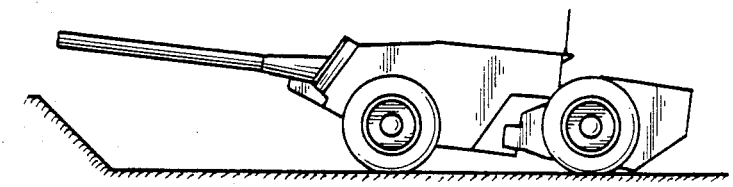

Another advantage of the variable-height suspension is the possibility of selective control of the forward casemate and of the after caisson. FIG. 5 shows the vehicle with forward casemate 1 in the "high" position, and after caisson 2 in the "low" position. Under these conditions, gun 8 can be superelevated with respect to its normal setting on the front face of forward casemate 1.

Figure 6:
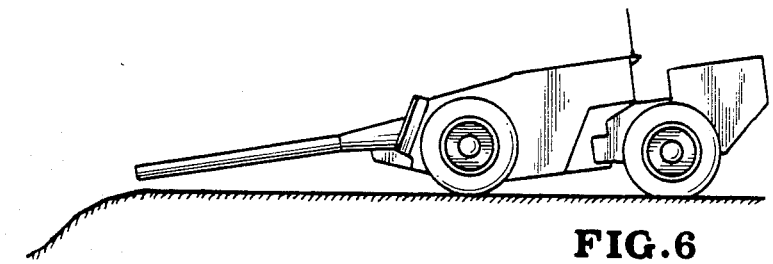

On the other hand, if forward casemate 1 is in the "low" position, gun 8 can be depressed with respect to its normal setting on the front face of forward casemate 1, as will be seen from FIG. 6.

Selective control of the variable-height suspension thus tends to enhance the potential for the vehicle to fire its gun under the circumstances described above.

In accordance with a supplementary characteristic that too serves to implement the properties of the variable-height suspension, the self-propelled armored vehicle is further characterized by the fact that the forward casemate is fitted with a movable underbrush-thinning blade mounted on the forward part of its front section. This blade can be lowered to enable the vehicle to be used as its own excavator.

FIGS. 1 and 2 of the appended drawings show this underbrush-thinning blade, 20, attached to the forward part of the front section of forward casemate 1, under gun 8. The raised or lowered position of blade 20 is controlled by hydraulic cylinders 21 attached to the chassis of forward casemate 1.

The vehicle can, when the blade is lowered, act as its own ground excavator, something or particular advantage when the vehicle's crew wants to "dig in" the vehicle in a camouflage pit and offer a smaller target to enemy fire. The use of the underbrush-thinning blade is also of advantage when it is desired, as described above, to place the vehicle in the aimed position prior to clearing the gun to the view of the enemy.

The depth of the excavation made by the vehicle obviously will depend on the adjustment, simultaneously, or selectively, of the variable-height suspension of the forward casemate and after caisson, as well as on the depth to which the blade is lowered.

I claim:

1. A self propelled articulated armored vehicle comprising:
    a forward casemate,
    an after caisson,
    said forward casemate and said after caisson being joined, one with the other, around a vertical pivot axis,
    said forward casemate being supported by at least one train of driving wheels,
    said after caisson being supported by at least one train of driving wheels,
    said forward casemate having means for accommodating at least one weapon, ammunition, equipment to maneuver the vehicle and to sight the weapon, and the crew,
    said after caisson having means for accommodating the vehicle's power package for energizing said driving wheels,
    said driving wheels being mounted on a variable-height suspension,
    means acting symmetrically for linking said forward casemate to said after caisson to determine the relative horizontal angular position of said forward casemate with respect to said after caisson,
    and means for varying the variable height suspension of said driving wheels supporting said forward casemate and said after caisson to determine the relative height of said forward casemate and said after caisson with respect to the ground.

2. Self-propelled armored vehicle in accordance with claim 1, characterized by the fact that the forward casemate has attached to the forward part of its front section a movable underbrush-clearing blade that can be lowered to permit the vehicle to act as its own excavator, the depth of penetration of the blade being a function of the level to which the blade is lowered and of the adjustment of the vehicle's variable-height suspension.

3. Self-propelled armored vehicle in accordance with claim 1 characterized by the fact that the weapon supported by the forward casemate is fitted with a sliding shoe at its forward part, and by the fact that the after caisson is fitted with at least two movable blades at the lower part of its after section that can be brought down to a horizontal position with respect to the vehicle as a unit.

* * * * *